US011698851B2

(12) United States Patent
Yin et al.

(10) Patent No.: US 11,698,851 B2
(45) Date of Patent: Jul. 11, 2023

(54) RECOMMENDING PROGRAMMATIC DESCRIPTIONS FOR TEST OBJECTS

(71) Applicant: MICRO FOCUS LLC, Santa Clara, CA (US)

(72) Inventors: Peng-Ji Yin, Shanghai (CN); Cheng Hua, Shanghai (CN); Jie Zhang, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 134 days.

(21) Appl. No.: 17/046,198

(22) PCT Filed: Apr. 28, 2018

(86) PCT No.: PCT/CN2018/085110
§ 371 (c)(1),
(2) Date: Oct. 8, 2020

(87) PCT Pub. No.: WO2019/205146
PCT Pub. Date: Oct. 31, 2019

(65) Prior Publication Data
US 2021/0073111 A1    Mar. 11, 2021

(51) Int. Cl.
G06F 11/36 (2006.01)
G06F 8/33 (2018.01)
G06N 5/02 (2023.01)

(52) U.S. Cl.
CPC ............ *G06F 11/3684* (2013.01); *G06F 8/33* (2013.01); *G06N 5/02* (2013.01)

(58) Field of Classification Search
None
See application file for complete search history.

(56) References Cited

U.S. PATENT DOCUMENTS 9,189,211 B1 * 11/2015 Nicholson ................. G06F 8/51
9,239,777 B1 *  1/2016 Cohen ................... G06F 11/368
9,740,596 B1    8/2017 Galburt
(Continued)

FOREIGN PATENT DOCUMENTS

CN       103530228 B     9/2016
CN       106933730 A     7/2017
(Continued)

OTHER PUBLICATIONS

RDocumentation "webElement-class" downloaded from <www.rdocumentation.org/packages/RSelenium/Versions/1.7.7/topics/webElement-class> on Jun. 3, 2022 (Year: 2022).*
(Continued)

*Primary Examiner* — Jason D Mitchell
(74) *Attorney, Agent, or Firm* — Sheridan Ross P.C.

(57) ABSTRACT

A technique includes receiving, by a computer, user input representing creation of a first programmatic description of a first test object of source code to be tested. The technique includes, in response to receiving the user input, determining, by the computer, based on other programmatic descriptions of other test objects, a recommendation of a parameter to be used in the first programmatic description to identify the first test object. The technique includes causing, by the computer, a display of the recommendation.

20 Claims, 4 Drawing Sheets

(56) References Cited

U.S. PATENT DOCUMENTS

| | | | |
|---|---|---|---|
| 2004/0003335 A1* | 1/2004 | Gertz | H03M 13/47 714/758 |
| 2007/0198970 A1 | 8/2007 | Horii | |
| 2008/0270981 A1* | 10/2008 | Hutchison | G06F 8/33 717/110 |
| 2008/0320438 A1* | 12/2008 | Funto | G06F 8/33 717/106 |
| 2009/0254880 A1* | 10/2009 | Gryko | G06F 8/33 717/109 |
| 2011/0271250 A1* | 11/2011 | Park | G06F 8/33 717/113 |
| 2013/0159960 A1* | 6/2013 | Sivaramakrishnan | G06F 8/33 717/100 |
| 2014/0013299 A1* | 1/2014 | Bordeaux | G06F 8/30 717/106 |
| 2014/0109042 A1* | 4/2014 | Christensen | G06F 8/36 717/109 |
| 2015/0100943 A1* | 4/2015 | Gabel | G06F 40/20 717/106 |
| 2016/0019129 A1 | 1/2016 | Wu | |
| 2018/0010910 A1 | 1/2018 | Dotschkal | |
| 2018/0024816 A1* | 1/2018 | Au | G06F 8/33 717/108 |
| 2018/0173606 A1* | 6/2018 | Malla | G06F 11/368 |
| 2018/0174060 A1* | 6/2018 | Velez-Rojas | G06N 5/02 |
| 2019/0227774 A1* | 7/2019 | Banuelos | G06F 8/36 |

FOREIGN PATENT DOCUMENTS

| | | |
|---|---|---|
| CN | 105373472 B | 11/2017 |
| CN | 107783901 A | 3/2018 |
| CN | 105607993 B | 4/2018 |

OTHER PUBLICATIONS

Author Unknown; 472/GUI Testing; Agile Automation and Unified Functional Testing; 2 pages.

Author Unknown; STG; How to Enhance Tests with Descriptive Programming in QTP; 6 pages.

Kushway, Sumeet Singh; LeanFt's Object Identification Center; Automation Insights; https://sumeetkushwah.com/2015/09/17/leanfts-object-identification-center/; Feb. 25, 2018; 6 pages.

QeWorks; Object Repository in QTP; http://qeworks.com/object-repository-in-qtp/; 2018; 3 pages.

International Search Report and Written Opinion; PCT/CN2018/085110; dated Feb. 1, 2019; 9 Pages.

\* cited by examiner

RECOMMENDING PROGRAMMATIC DESCRIPTIONS FOR TEST OBJECTS

BACKGROUND

Test automation software may be used for purposes of performing functional and regression testing for software applications and environments. As examples, test automation software may be used to test a web service, a graphical user interface (GUI), an application programming interface (API), and so forth. In general, test automation software may be used to manipulate objects and controls of the entity under test. For example, for purposes of testing a web service, test automation software may be executed for purposes of manipulating different objects of a web page, such as buttons, windows, and so forth.

DETAILED DESCRIPTION

Figure 1:
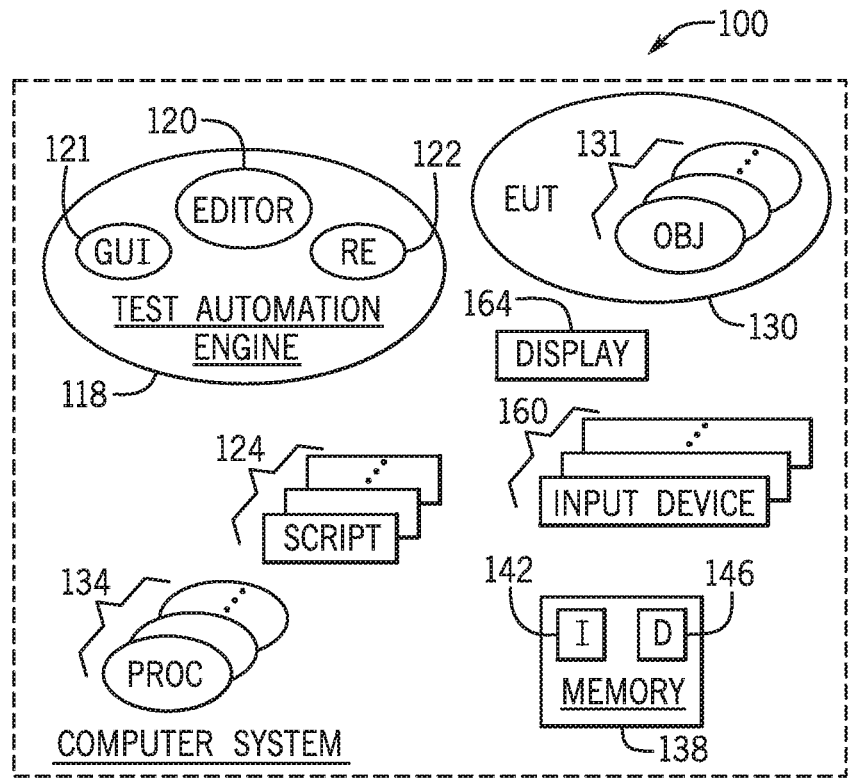
FIG. 1 is a schematic diagram of a computer system according to an example implementation.

In accordance with example implementations, a test automation engine may be used to perform functional testing and regression analysis of a particular software-based entity, called the "entity under test," or "EUT," herein. In this context, the EUT refers to a particular software environment, service or set of machine executable instructions, which may be tested by the test automation engine. As examples, the test automation engine may test controls of a graphical user interface (GUI), different user inputs to the GUI, the functioning of an application programming interface (API), controls and functions of a web service, and so forth. For this purpose, the test automation engine may execute a user-defined set of machine executable instructions, called a "script," or "test script," herein. The test automation engine may include, for example, an editor, which allows a user (e.g., a programmer) to create, view and edit a script that details a particular test procedure to be used on the EUT.

In general, a script may contain references to objects (also called "test objects" herein) of the EUT. As examples, the objects may be clickable buttons, dialogue boxes, windows, pages, and so forth. A given object may have several properties, with these properties having respective values. For example, a window object may have such properties as x and y coordinates; text; a height; a width; a Boolean indicator representing the absence or presence of a scroll bar; and so forth. Moreover, an object may have a respective hierarchy, in that a given object may have a parent, a child, and so forth.

One way for a script to reference a particular object is for the object to be stored in an object repository. In this manner, the script may reference an object that is stored in the object repository under a specific name. The object repository stores parameters and values for objects of the EUT. The object name uniquely identifies the object in the object repository so that during a run session (or "run time"), the test automation engine may find the stored information for the object in the object repository based on, for example, the object name and its parent. Statements may be added to the script to perform various operations on the object by referencing the object name.

Through the use of a descriptive programming language, the script may alternatively refer to an object without referring to the object repository or to the object's name. In this manner, in lieu of a reference to an object repository name for an object, the object may be defined by a programmatic description. A "programmatic description" for an object of the EUT refers to a statement of the script, which conforms to a particular syntax and references the object (so that the object may be identified by the test engine) using a list of one or multiple selected properties (also called "property names" herein) of the object and the corresponding property values for these properties.

As an example, an object (called a "TestObject" for the example below) of the EUT may be referenced in the script by the following programmatic description syntax:

TestObject("PropertyName1:=PropertyValue1", PropertyName2:=PropertyValue2",......, "PropertyNameN:=PropertyValueN").DoSomething For the example above, "TestObject ( . . . )" is the programmatic description for an object of the EUT; "TestObject" is the particular category or class of the object and the properties and values inside the parameters that the test engine uses to ideally uniquely identify the object. "DoSomething" refers to a command to be executed on the object that is referenced by the programmatic description.

A programmatic description may be useful for a number of different scenarios. For example, an object of the EUT, which is referenced by a script may not be stored in the object repository. Accordingly, a programmatic description may allow the test automation engine to find the object at run time by describing select properties and corresponding values, instead of using a name to locate the object in an object repository. As another example, a number of objects may have common identical properties. In this manner, for some applications, objects may have unique identification properties, whereas in other applications, many objects may have the same identification properties, making it more difficult for the test automation engine to find the object in the object repository. As another example, an object may be created dynamically during a run session, depending on user input. As such, the object may not exist when the test automation engine is learning the script. As another example, a script may be used to test a web application on different browsers. Each browser may, however, render the object differently and may cause challenges in the test automation engine's identification of the object. The programmatic description, in turn, allows the test automation engine to find the object based on certain properties and property values without depending on the specific way in which the browser defines the object.

It may be particularly challenging for a user (e.g., a programmer) to determine a set of properties to include in a programmatic description, which uniquely identifies the object. For example, a particular test object may have tens of properties, and it may be challenging for the user to identify specific properties that may uniquely identify the object. For example, a WinObject (an object representing a displayed window, for example) may have the associated set of properties:

```
Class Name:=WinObject"
"abs_x:=1851",
"abs_y:=1040",
"attached text:=",
"enabled:=True",
"focused:=False",
"hashscroll:=False","hasvscroll:=False","height:=40", "hscrollpagesize:="
"hscrollposition:=","hwnd:=131400","leftscrollbar:=False",
"maxhscrollpos:=","maxvscrollpos:=","minhscrollpos:=",
"minvscrollpos:=",
"nativeclass:=TrayClockWClass", "object class:=TrayClockWClass"
"regexpwndclass:=TrayClockWClass", "regexpwndtitle:=System Clock,
8:13 PM, 1/23/2018", "rightaligned:=False",
"righttoleftlayout:=False", "righttoleftreading:=False",
"text:=System Clock, 8:13 PM, 1/23/2018", "va_name:=",
"visible:=True",
"vscrollpagesize:=", "vscrollposition:=", "width:=64", "window id:=0",
"windowextendedstyle:=0",
"windowstyle:=1409286144", "x:=1851",
"y:=0"
```

For the example above, the "abs_x" property represents the absolute value for the x coordinate of the object; the "abs_y" property represents the absolute value for the y coordinate of the object; the "attached text" property represents static text attached to a control (here; none); "enabled" is a Boolean value indicating whether the object is enabled; "focused" is a Boolean value representing whether the object has focus; "hashscroll" is a Boolean value indicating whether the object has a horizontal scrollbar; "hasvscroll" is a Boolean value representing whether the object has a vertical scrollbar; "height" represents the object's height (in pixels); "hscrollpagesize" represents the horizontal page size; "hscrollposition" represents the position of the horizontal scroll box; "hwnd" represents the handle of the run time object's window; "leftscrollbar" is a Boolean value representing whether the vertical scrollbar is positioned on the left side of the object; "maxhscrollpos" represents the maximum horizontal scrolling position; "maxvscrollpos" represents the maximum vertical scrolling position; inhscrollposn represents the minimum horizontal scrolling position; "minvscrollpos" represents the minimum vertical scrolling position; "nativeclass" represents the class to which the object belongs; "object class" is a defined object class used to identify an object in the EUT; "regexpwndclass" is the permanent part of an operating system-defined window class; "regexpwndtitle" represents the constant part of the window title; "rightaligned" is a Boolean value representing whether the object has generic right-aligned properties; "righttoleftlayout" is a Boolean value representing whether the object's horizontal origin is on the right edge; "righttoleftreading" is a Boolean value representing whether the object's text is displayed using right-to-left reading order properties; "text" represents text associated with the object; "visible" is a Boolean value representing whether the object is visible; "vscrollpagesize" represents the vertical page size; "vscrollposition" represents the position of the vertical scroll box; "width" represents the object's width in pixels; "window id" represents the object's window identifier; "windowextendedstyle" represents the extended window style of the object; "windowstyle" represents the window style of the object; "x" represents the object's lefthand x coordinate relative to the parent window in position; and "y" represents the object's top y coordinate relative to the parent window in pixels.

All of the above-mentioned properties, however, may not be used for a particular WinObject. Moreover, some property/property value combinations for some WinObjects may be similar to each other. As such, the task of selecting the particular properties to be used for a programmatic description for a particular object may not be straightforward for the user. In the course of testing whether a particular set of a property values may be used for a particular programmatic description, the user may use a trial and result method. As an example, in an automation test software called "Unified Functional Testing," or "UFT," the user may use a highlight function to determine if properties entered by the user uniquely descriptively reference the object. The user may have to undergo a series of iterations to determine a valid set of properties to use in the programmatic description for a given test object: the user may have to, in each iteration, select a combination of properties and corresponding property values, use the highlight function to determine if the selected combination of properties and property values may be used in the programmatic description, and if not; begin another iteration. Thus, determining a valid programmatic description for a test object may involve a rather lengthy trial and error process.

In accordance with example implementations that are described herein, a test automation engine includes a recommendation engine, which; for a programmatic description of a given test object, suggests; or recommends, a set of one or multiple properties (i.e., property names) for a programmatic description of the test object. As described further herein, in accordance with some implementations, the recommendation engine may detect a user entering, or creating a programmatic description for a test object (e.g., entering script according to a syntax that is consistent with a programmatic description). In accordance with example implementations, in response to this detection, the recommendation engine provides a recommendation of properties for the user to include in the programmatic description. The recommendation engine may perform a statistical analysis of how similar test objects have been defined in programmatic descriptions in the current script and/or in other scripts and recommend properties based on this statistical analysis.

More specifically, in accordance with example implementations, a test object may be associated with a particular type, category or "class," For example, the test object may be a WinObject, a WebButton, a page, and so forth. Using the same class as the object, the recommendation engine may analyze script language (from the same script or from different scripts, as examples) to determine, or identify, programmatic descriptions for objects belonging to this class; and more specifically, in accordance with example implementations, the recommendation engine may identify the property name and value combinations that have previously been used in the programmatic descriptions for the class. The recommendation engine may, in accordance with example implementations, determine the relative frequency of use of the combinations, such that the recommendation engine determines, or identifies, the particular combination of properties that has been used the most and correspondingly recommend the combination to the user.

In accordance with example implementations, the recommendation engine may display the most frequently used combination of property names to the user (through the editor) so that the user may use this specific combination of property names (while filling in the appropriate values) for the programmatic description being entered by the user. In accordance with some implementations, the recommendation engine may display a ranked list of property name combinations so that the user may be apprised of the top recommended combination of properties for the programmatic description, as well as other possibly acceptable alternative combinations. Moreover, in accordance with some implementations, the recommendation engine may perform a statement completion function by, in response to the user beginning a programmatic description for a particular test object, automatically filling in suggested properties for the description in the script, so that the user may complete the programmatic description by supplying the corresponding property values.

Referring to FIG. 1, as a more specific example, in accordance with some implementations, a computer system 100 may include a test automation engine 118, which may be used to perform functional and/or regression testing of an entity under test (EUT) 130. As examples, the EUT 130 may be a service, an environment or a set of machine executable instructions under test, such as an application, a component of an application (an application programming interface (API), for example), a web service, a software environment, and so forth. The EUT 130 includes one or multiple test objects 131 that may be manipulated (for purposes of testing the EUT 130) via the test automation engine's execution of one or multiple scripts 124. In this context, a "script" refers to machine executable instructions that are executed by a machine, such as the test automation engine 118 or a machine under control of the test automation engine 118, to test the EUT 130.

The test automation engine 118 may provide a graphical user interface (GUI) 121 to present visual feedback to a user (such as a programmer) via a display 164 (a monitor, for example) of the computer system 100 and receive input from the user through one or multiple input devices 160 (a keyboard, a touchpad, a mouse, and so forth) of the computer system 100. The test automation engine 118 may include a viewer, or editor 120, which allows the user to create, view and edit a set of instructions for the test automation engine 118 to execute, such as the script 124. As also depicted in FIG. 1, the test automation engine 118 may include a recommendation engine 122 that, as further described herein, provides suggestions, or recommendations, of programmatic descriptions for test objects of the EUT 130.

In general, the computer system 100 may be a desktop computer, a server, a client, a tablet computer, a portable computer, a public cloud-based computer system, a private cloud-based computer system, a hybrid cloud-based computer system (i.e., a computer system that has public and private cloud components), a private computer system having multiple computer components disposed on site, a private computer system having multiple computer components geographically distributed over multiple locations, and so forth.

In accordance with some implementations, the computer system 100 may include one or multiple computers, such as one or multiple personal computers, workstations, servers, rack-mounted computers, special purpose computers, and so forth. Depending on the particular implementation, the computers of the computer system 100 may be located at the same geographical location or may be located at multiple geographical locations. Moreover, in accordance with some implementations, the computers may be rack-mounted computers, such as sets of the computers may be installed in the same rack. In accordance with further example implementations, the computer system 100 may include one or multiple virtual machines that are hosted by one or multiple computers.

In accordance with example implementations, the computer system 100 may include one or multiple physical hardware processors 134, such as one or multiple central processing units (CPUs), one or multiple CPU cores, and so forth. Moreover, the computer system 100 may include a memory 138. In general, the memory 138 is a non-transitory memory that may be formed from, as examples, semiconductor storage devices, phase change storage devices, magnetic storage devices, memristor-based devices, a combination of storage devices associated with multiple storage technologies, and so forth.

Regardless of its particular form, the memory 138 may store various data 146 (data representing test objects; test object names; test object property names and corresponding property values; scripts; script statements; parameters and data associated with the EUT 130; programmatic descriptions; and so forth). The memory 138 may also store instructions 142 that, when executed by one or multiple processors 134, cause the processor(s) 134 to form one or multiple components of the computer system 100, such as, for example, one or more of the test automation engine 118, the editor 120, the GUI 121, and the recommendation engine 122.

In accordance with some implementations, one or more of the components of the computer system 100 (such as the test automation engine 118, the recommendation engine 122, and so forth) may be implemented in whole or in part by a hardware circuit that does not include a processor executing machine executable instructions. For example; in accordance with some implementations, the recommendation engine 122 may be formed in whole or in part by a hardware processor that does not execute machine executable instructions, such as, for example, a hardware processor that is formed from an application specific integrated circuit (ASIC), a field programmable gate array (FPGA), and so forth. Thus, many implementations are contemplated, which are within the scope of the appended claims.

Figure 2:
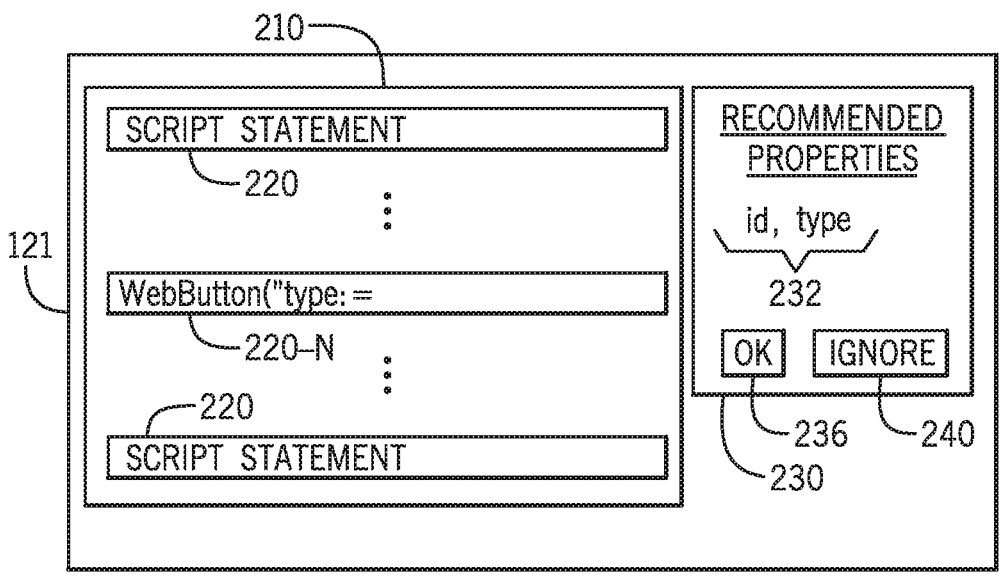
FIG. 2 is an illustration of a visual output provided by a test automation engine of the computer system of FIG. 1, depicting the recommendation of properties for a programmatic description of a test object according to an example implementation.

Referring to FIG. 2 in conjunction with FIG. 1, in accordance with some implementations, the editor 120 may, via GUI 121, provide a window 210 for purposes of allowing a user (e.g., a programmer) to create, view and edit a program to control the testing of the EUT 130. In particular, in accordance with some implementations, this program may be a script that includes script statements 220 that are displayed in the window 210. As illustrated in FIG. 2, a particular script statement 220-N may contain script language in the appropriate syntax to create a programmatic description of a test object 131 of the EUT 130. For the particular example of FIG. 2, the script statement 220-N illustrates the user entering text (here, WebButton ("type:=") to create a programmatic description for a WebButton, which is a particular category, or class, for a test object. For this example the WebButton may correspond to a graphical button that may be manipulated by (clicked on, for example) a user input, for example.

In accordance with example implementations, the test object 131 (FIG. 1) is a set of properties, where each property is defined by a property name and has a corresponding property value. In accordance with some implementations, the properties may be Hypertext Markup Language (HTML) attributes that have corresponding values. In general, the programmatic description for a test object is formed by defining the class ("WebButton" for the example of FIG. 2) and a proceeding parenthetical listing pairs of property names and corresponding values. For the example of FIG. 2, the user has entered "WebButton" and began a programmatic description for the WebButton test object by listing the "type" property for the WebButton and using the symbols: ":=" to denote the assignment of a particular value to the "type" property.

In accordance with example implementations, the recommendation engine 122 recognizes the creation of a programmatic description, such as the text that is illustrated for the WebButton definition in the statement 220-N of FIG. 2; and in response to recognizing that a programmatic description is being created, the recommendation engine 122 proceeds to recommend one or multiple properties, or property names, for the programmatic description. FIG. 2 illustrates an example window 230 that may be displayed via the GUI 121 by the recommendation engine 122 in accordance with example implementations, for purposes of illustrating recommended properties for the WebButton. For this example, the window 230 lists a combination 232 of two properties, or property names, to define the WebButton in the corresponding programmatic description: an "id" property name, denoting a particular identification for the WebButton; and a "type" property name, denoting a particular input type for the WebButton. The id property may ideally be unique for the object but may not be actually so due to, for example, different browsers for being tested. The "type" property specifies the type of input for the WebButton object, such as, for example, a clickable input. In accordance with example implementations, the window 230 may display such buttons as an OK button 236 for the user to click on to accept the recommended properties and an IGNORE button 240, which the user may click on for purposes of ignoring the recommendation or for purposes of causing the recommendation engine to, for example, generate another set of recommended properties for the programmatic descriptions.

In accordance with further example implementations, in lieu of the window 230 and/or in supplementation of the window 230, the recommendation engine 122 may perform an auto completion function by partially completing the programmatic description with the recommended properties. For example, in accordance with some implementations, the recommendation engine 120 may partially complete the programmatic description illustrated for script statement 220-N as follows: WebButton("id:=","type:=").

Figure 3:
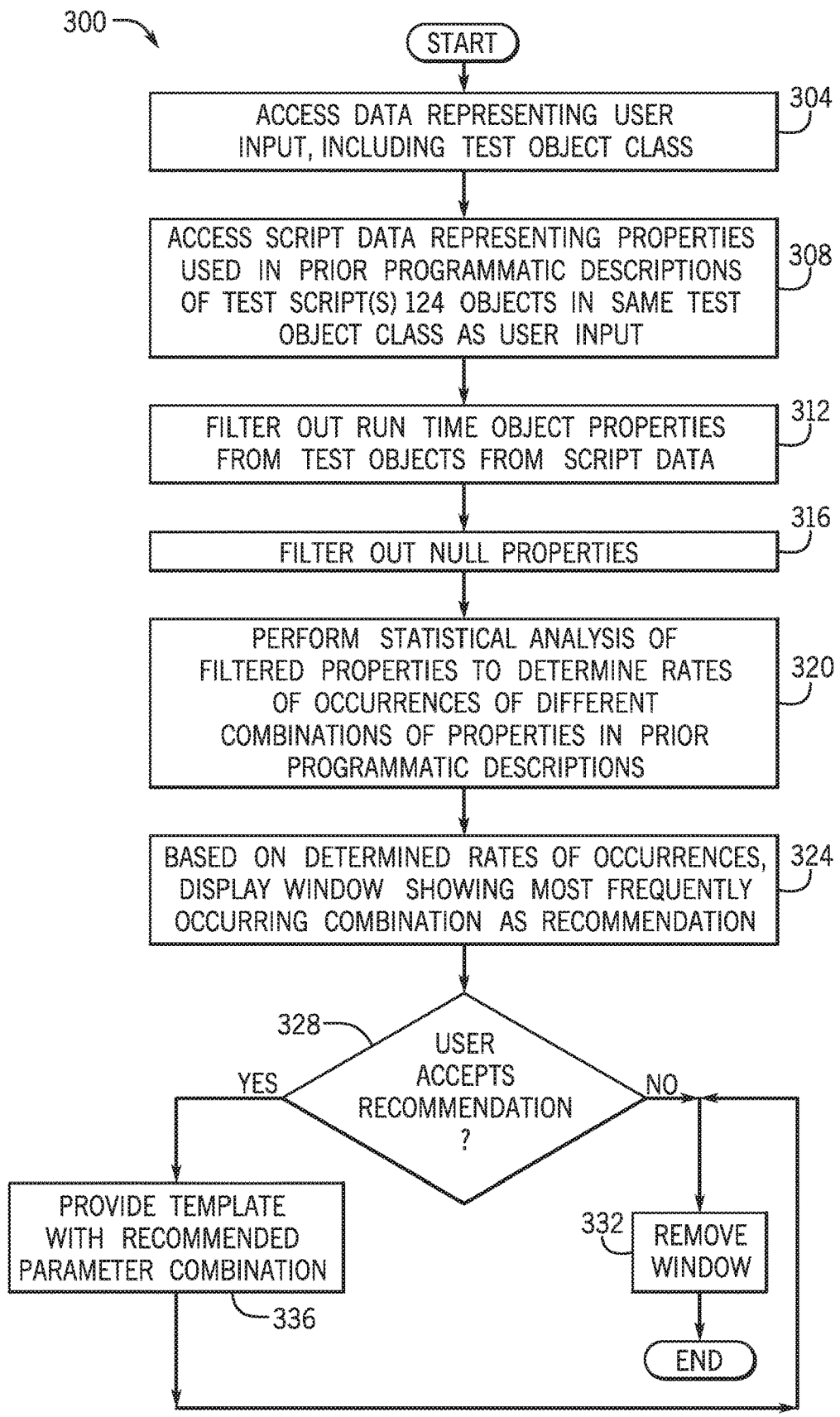
FIG. 3 is a flow diagram depicting a technique used by a recommendation engine of the test automation engine to provide recommended properties for a programmatic description according to an example implementation.

The recommendation engine 120 may determine the recommended properties based on prior valid programmatic descriptions for test objects of the same class. More specifically, referring to FIG. 3 in conjunction with FIG. 1, in accordance with example implementations, the recommendation engine 120 may perform a technique 300 that includes the recommendation engine 120 accessing (block 304) data, which represents the partial programmatic description that has been entered for the test object, including the test object class. Pursuant to block 308 of the technique 300, the recommendation engine 120 may also access (block 308) script data, representing properties used in prior programmatic descriptions of test objects in the same test object class as the user input. It is noted that the script data from the current script 124 is being viewed and/or edited by the user as well as separate and/or independent scripts 124.

Pursuant to block 312, the recommendation engine 122 may filter out run time object properties from the test objects. In general, a "run time" object property is a property that is likely to be different during the run time, i.e., the time in which the script is executed. As such, a run time property may not be reliable for object identification. As a more specific example, the "x" and "y" coordinates of a window are likely to be different each time the window is opened. The dynamic nature of the run time object property may be contrasted to a static object property, which is a relatively stable property that is likely to be the same during the run time. For example, a static object property may be the tile of a window or a web object's HTML tag or id attribute. Thus, the filtering of block 312 removes unreliable identification properties from being considered by the recommendation engine 122.

The recommendation engine 122 may, pursuant to block 316, filter out other object properties, such as, for example, null properties, i.e., properties for which there are no assigned values. The recommendation engine 122 may, pursuant to block 320, perform a statistical analysis of the filtered properties to determine rates of occurrences (i.e., the percentage of use) for different combinations of properties in the prior programmatic descriptions. For example, based on the statistical analysis of the filtered properties, the recommendation engine 122 may determine the following for programmatic descriptions of the "WebButton" object:

TABLE 1

| Test Object Class | Property Combination | Percentage Use |
| --- | --- | --- |
| Button | id, type | 70% |
| Button | type, name, text | 27% |
| Button | type, name, disabled | 3% |

In accordance with some implementations, the recommendation engine 122 may, pursuant to block 324, display a window showing the most frequently occurring combination of property values, such as a window similar to Table 1 above. In accordance with some implementations, the recommendation engine 122 may select the most frequently used combination (e.g., the combination of id and type, as depicted in the example of Table 1) and display this combination of property values to the user. As mentioned above, in accordance with further example implementations, the recommendation engine 122 may perform a partial automatic completion of the programmatic description.

It is noted that even with the suggested, or recommended, combination of property names, the particular combination of properties and property values that are entered by the user may define a programmatic description that cannot uniquely identify the object. In accordance with some implementations, the recommendation engine 122 may recognize the failure of the suggested combination and recommend, or auto complete, another combination of properties (such as, for example, the second most frequently used combination of properties, for example).

For implementations in which the recommendation 122 displays the recommended properties, the recommendation engine 122 may determine (decision block 328) whether the user accepts the recommendations, and if so, the recommendation engine 122 may remove the window, pursuant to block 332. In accordance with example implementations, if the user accepts the recommendation, the recommendation engine 122 may provide (pursuant to block 336) a template with the recommended parameter combination. In this manner, in accordance with some implementations, in response to the user clicking on an OK button to accept the recommendation, the recommendation engine 122 may perform a partial auto completion of the programmatic description, with the user filling in the values for the properties, for example.

Figure 4:
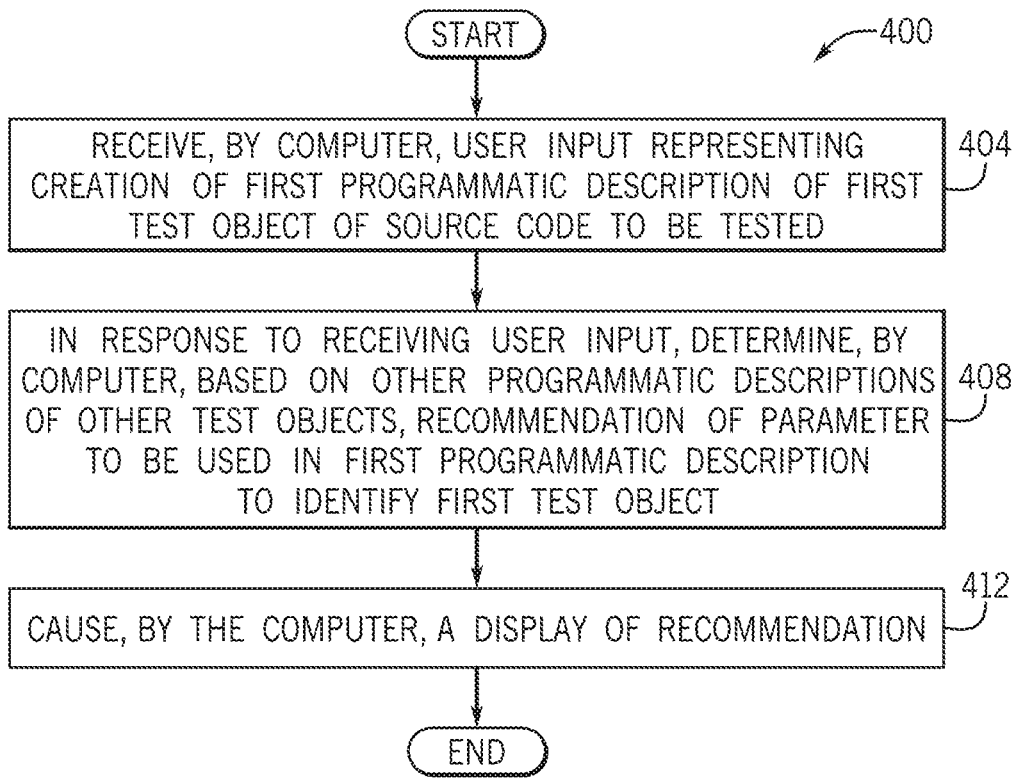
FIG. 4 is a flow diagram depicting a technique to recommend a parameter to be used in a programmatic description of a test object according to an example implementation.
Figure 5:
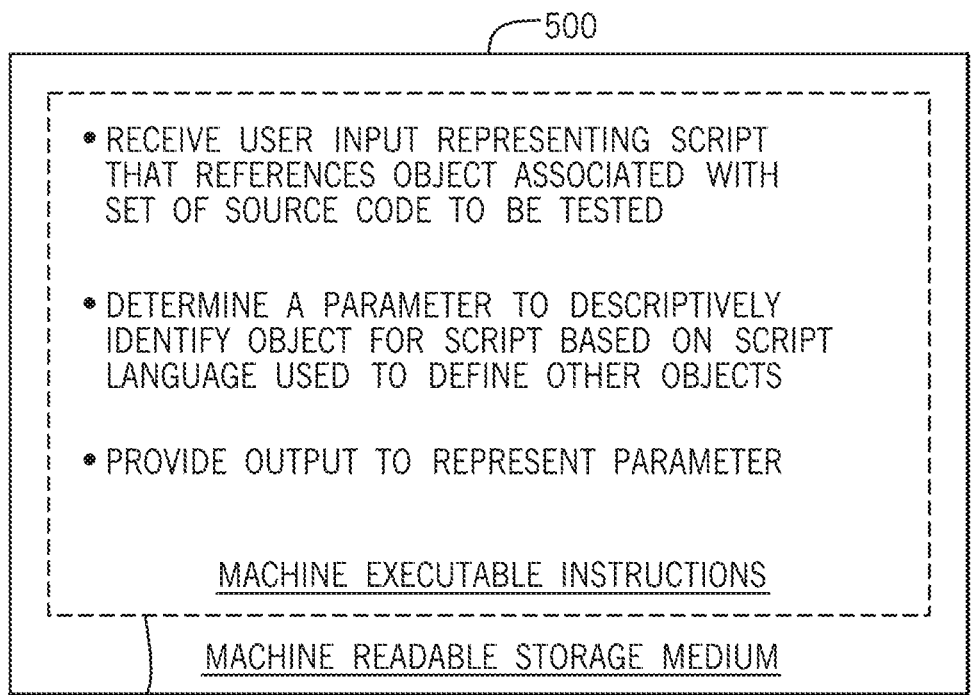
FIG. 5 is an illustration of machine executable instructions stored on a machine readable storage medium to cause a machine to determine a suggested parameter to descriptively identify an object for a script according to an example implementation.

Thus, referring to FIG. 4, in accordance with example implementations, a technique 400 includes receiving (block 404), by a computer, user input representing the creation of a first programmatic description of a first test object of source code to be tested. The technique 400 includes, pursuant to block 408, in response to receiving the user input, determining, by the computer, based on other programmatic descriptions of other test objects, a recommendation of a parameter to be used in the first programmatic description to identify the first test object. The technique 400 includes causing, by the computer, a display of the recommendation, pursuant to block 412.

In accordance with example implementations, a non-transitory machine readable storage medium 500 stores machine executable instructions 518 that, when executed by a machine, cause the machine to receive user input representing a class and candidate parameters of a script to descriptively represent an object that is associated with a set of source code to be tested. The instructions, when executed by the machine, cause the machine to determine a parameter to descriptively identify the object for the script based on script language used to define other objects. Moreover, the instructions, when executed by the machine, cause the machine to provide output to represent the parameter.

Figure 6:
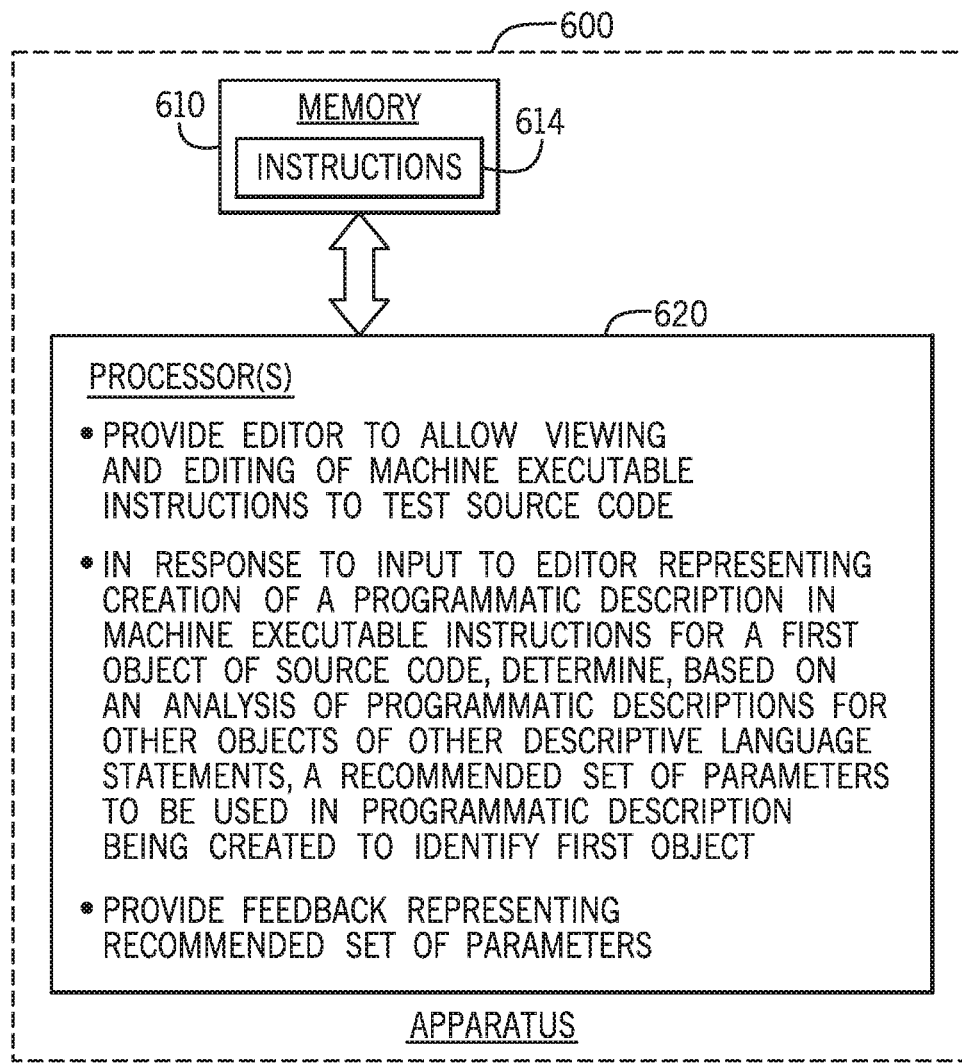
FIG. 6 is a schematic diagram of an apparatus to provide feedback representing a recommended set of parameters to be used in a programmatic description statement to identify an object according to an example implementation.

Referring to FIG. 6, in accordance with example implementations, an apparatus 600 includes at least one processor 620 and a memory 610 to store instructions 614 that, when executed by the processor(s) 620, cause the processor(s) 620 to provide an editor to allow viewing and editing of source code to test source code; and in response to an input to the viewer representing creation of a descriptive language statement in the source code referencing an object in the source code, determine, based on an analysis of descriptions of other descriptive language statements, a recommended set of parameters to be used in the statement being created to identify the object. The instructions when executed by the processor(s), cause the processor(s) to provide feedback, which represents the recommended set of parameters.

While the present disclosure has been described with respect to a limited number of implementations, those skilled in the art, having the benefit of this disclosure, will appreciate numerous modifications and variations therefrom. It is intended that the appended claims cover all such modifications and variations.

The invention claimed is:

1. A method, comprising:
receiving, by a computer, user input representing creation of a first programmatic description of a first test object of source code to be tested;
in response to receiving the user input, determining, by the computer, based on other programmatic descriptions of other test objects, a recommendation from an ordered list of a plurality of recommendations of a parameter to be used in the first programmatic description to identify the first test object;
causing, by the computer, a display of the recommendation;
receiving, by the computer, user input representing the parameter for the recommendation;
recognizing, by the computer, a failure of the recommendation to identify the first test object; and
automatically generating, by the computer, another recommendation from the ordered list of the plurality of recommendations to identify the first test object in response to the failed recommendation to identify the first test object,
wherein the another recommendation is a second recommendation from the ordered list of the plurality of recommendations.

2. The method of claim 1, wherein determining the recommendation comprises determining a category for the first test object, and wherein the other test objects belong to the category.

3. The method of claim 2, wherein the category comprises a class of the first test object.

4. The method of claim 1, wherein determining the recommendation comprises searching the user input to find the other programmatic descriptions.

5. The method of claim 1, wherein determining the recommendation comprises statistically analyzing the other programmatic descriptions of the other test objects and wherein the recommendation is based on a result of the statistical analysis.

6. The method of claim 5, wherein statistically analyzing the other programmatic descriptions comprises determining how often one programmatic description of the other programmatic descriptions is used relative to another programmatic description of the other programmatic descriptions.

7. The method of claim 5, wherein the result of the statistical analysis comprises one programmatic description of the other programmatic descriptions being used more often than another programmatic description of the other programmatic descriptions, wherein the recommendation comprises recommending the one programmatic description over the other programmatic descriptions.

8. The method of claim 5, wherein the other programmatic descriptions represent a plurality of object properties, and statistically analyzing the other programmatic descriptions comprises filtering out properties of the plurality of object properties having associated null values to provide candidate properties and statistically analyzing the candidate properties.

9. The method of claim 1, wherein the user input comprises a descriptive programming language script.

10. The method of claim 1, wherein the display comprises a combination of object properties for the first programmatic description to describe the first test object.

11. The method of claim 1, further comprising:
identifying the first test object in the user input by the first programmatic description in lieu of identifying the first test object by an object repository name.

12. A non-transitory storage medium that stores machine executable instructions that, when executed by a machine, cause the machine to:
receive user input representing a script that references an object associated with a set of source code to be tested;
determine a parameter from an ordered list of a plurality of parameters to descriptively identify the object for the script based on script language used to define other objects;
provide output to represent the parameter;
receive user input representing the parameter;
recognize a failure of the parameter to identify the object; and automatically generate another parameter from the ordered list of the plurality of parameters to identify the object in response to the failure of the parameter to identify the object,
wherein the another parameter is a second parameter from the ordered list of the plurality of parameters.

13. The storage medium of claim 12, wherein the script language is part of the script.

14. The storage medium of claim 12, wherein the script language is associated with other scripts.

15. The storage medium of claim 12, wherein the instructions, when executed by the machine, cause the machine to:
identify objects having a class in common with the class of the object; and
filter out dynamic properties of the identified objects associated with runtime determined values to provide filtered properties, wherein the determination of the parameter is based on the filtered properties.

16. The storage medium of claim 15, wherein the set of source code comprises executable instructions to provide at least one of an application programming interface (API), component of an application, or a component of a graphical user interface (GUI).

17. An apparatus, comprising:
at least one processor; and
a storage medium to store instructions that, when executed by the at least one processor, cause the at least one processor to:
provide an editor to allow viewing and editing of machine executable instructions to test source code;
in response to an input to the editor representing creation of a programmatic description in the machine executable instructions, to identify a first object of the source code, determine, based on an analysis of descriptions of other programmatic descriptions of other objects, a recommended set of parameters from an ordered list of a plurality of recommended sets of parameters to be used in the programmatic description being created to identify the first object;
provide feedback representing the recommended set of parameters;
receive an input representing the recommended set of parameters;
recognize a failure of the recommended set of parameters to identify the first object; and
automatically generate another recommended set of parameters from the ordered list of the plurality of recommended sets of parameters to identify the first object in response to the failure of the recommended set of parameters to identify the first object,
wherein the another recommended set of parameters is a second recommended set of parameters from the ordered list of the plurality of recommended sets of parameters.

18. The apparatus of claim 17, wherein the instructions, when executed by the at least one processor, cause the at least one processor to:
determine a list of candidate property value combinations to identify the first object;
rank the candidate property value combinations in the list of candidate property value combinations; and
display the ranked candidate property value combinations based on the ranking.

19. The apparatus of claim 17, wherein:
the input representing creation of the programmatic description statement comprises a set of properties; and
the instructions, when executed by the at least one processor, cause the at least one processor to determine whether combinations of properties uniquely identify the first object.

20. The apparatus of claim 19, wherein the instructions, when executed by the at least one processor, cause the at least one processor to determine a recommendation representing the combinations of properties having a minimum number of properties that uniquely identify the first object.

* * * * *